Patented May 23, 1939

2,159,155

UNITED STATES PATENT OFFICE 2,159,155

PROCESS FOR THE MANUFACTURE OF SODIUM CITRATE DI-HYDRATE

Homer H. Holton, Corona, Calif., assignor to California Fruit Growers Exchange, Los Angeles, Calif., a corporation of California No Drawing. Application November 22, 1937, Serial No. 175,855

7 Claims. (Cl. 260—535)

This invention relates to a process for the preparation of sodium citrate di-hydrate.

Sodium citrate is ordinarily made by adding sodium carbonate monohydrate to a hot aqueous solution of citric acid. The resulting solution is then evaporated until crystallization takes place. A further method for producing sodium citrate is by decomposing calcium citrate by means of an alkali metal salt. The normal sodium salt of citric acid is known to exist in two forms, namely, the so-called penta-hydrate,

$$2(C_6H_5O_7Na_3).11H_2O$$

and the di-hydrate $C_6H_5O_7Na_3.2H_2O$. In the processes of manufacture that have been used up to the present, extreme care must be used in order that mixtures of these two salts are not obtained.

Heretofore in the production and manufacture of sodium citrate, considerable difficulty has been experienced in the manufacture of the di-hydrate, since this form is readily converted to the penta-hydrate. Oftentimes this results in a mixture of the two salts. This is obviously disadvantageous since the resulting product is of uncertain composition and properties. Moreover, the penta-hydrate form readily effloresces thereby becoming opaque, whereas the di-hydrate remains substantially clear.

This invention is directed toward the manufacture of sodium citrate di-hydrate, and more particularly to an improved method whereby this form of the salt may be manufactured free and separate from the penta-hydrate form.

Accordingly an object of this invention is to provide and disclose methods and means of producing sodium citrate di-hydrate in a substantially pure form.

Another object of this invention is to provide and disclose methods and means of producing sodium citrate di-hydrate by means of vacuum crystallization.

These and other objects and advantages will be apparent from a description of the product and processes embodied in the specification and will present themselves to those skilled in the art in the contemplation and use of this invention.

I have found that it is possible to produce pure sodium citrate di-hydrate from relatively impure aqueous solutions of citric acid, or from relatively impure crystals of citric acid. I do not mean to imply, however, that my process is limited to these source materials, since, for instance, I may start with commercial citric acid either in the anhydrous or hydrated form.

The following procedure discloses the conditions under which sodium citrate di-hydrate may be produced from relatively pure citric acid crystals.

A solution of the citric acid crystals is first made by dissolving the relatively pure citric acid crystals in water. The resulting liquor which should preferably have a density of from 16–18 degrees Baumé, will in this case be comparatively free from impurities. The density of the starting liquor should be carefully controlled within the above mentioned limits, since, in the subsequent neutralization step the density increases by 12 or 15 degrees Baumé. It at once becomes apparent to those skilled in the art that with a starting liquor having too great a density before neutralization the resulting reaction will be considerably slowed down and impeded by the lower solubility and acidity of the high concentrations as well as the greater amount of foaming which will take place at higher concentrations.

After the density of the starting liquor has been adjusted to within the proper range, the acid is preferably neutralized with sodium carbonate. One can use sodium bicarbonate or sodium hydroxide either dry or in solution, as desired. I have found that it is important that the pH of the neutralized solution be carefully controlled. I have found further that the preferable range for the pH of the neutralized solution is between pH 5.70 and pH 6.20 as determined on a sample of the treated liquor diluted to 2.6 to 2.8 degrees Baumé at 25° C., as measured by means of a quinhydrone electrode in connection with a calomel half-cell. Subsequent operations will be further facilitated if the pH at this stage is adjusted to between pH 6.03 and pH 6.15.

If, during the neutralization step, the liquor has become contaminated due to the introduction of foreign materials, the liquor should preferably be filtered. This may be done by any suitable means, as for example, through a plate and frame filter press using a diatomaceous earth as a filter aid.

The density of the neutralized and filtered liquor should now be about 28 to 34 degrees Baumé.

The aqueous solution of sodium citrate is placed in a vacuum pan and directly evaporated to a density of from 39 to 41 degrees Baumé, or to the graining point. From this point a careful control of the temperature should be maintained. The temperature should not be lower than about 47° C., and preferably not below 55° C. The absolute pressure should not be less than 2.6 inches and preferably about 3.4 inches. Under some circumstances it may be found necessary to increase the absolute pressure in order to maintain the temperature within the desired range. It is to be noted that if the temperature drops much below 47° C. and the absolute pressure drops as low as about 2.6 inches of mercury one will obtain sodium citrate penta-hydrate.

As soon as the graining has taken place, additional filtered liquor may be continuously drawn into the vacuum pan whereupon continued crystallization of sodium citrate di-hydrate will take place. When a sufficiently large volume of magma has been produced in the vacuum pan, the liquor feed is shut off and the magma allowed to thicken to a desirable point. The crystal magma is then dropped into a suitable jacketted mixer wherein the temperature of the mass is not allowed to fall below 50° to 55° C. From the mixer the crystal mass is fed to a centrifuge wherein it is washed in the usual manner. The mother liquor and the wash water may be returned to the holding tank where the pH is adjusted and the liquor filtered and recooked. The washed crystals are dried in a suitable manner. The sodium citrate di-hydrate produced in accordance with the above disclosure will be a free flowing crystal-clear product, testing not less than 98½% $Na_3C_6H_5O_7.2H_2O$ and coming within the specification for sodium citrate di-hydrate as disclosed in the U. S. Pharmacopoeia No. XI.

As mentioned hereinbefore, it is to be understood that other materials may be used as the starting point for the preparation of sodium citrate di-hydrate in accordance with the disclosures herein contained. Crude citric acid liquor made from impure citric acid may be purified in the usual manner and used as a starting point.

Although we have mentioned that the preferred temperature during crystallization should preferably be over 55° C., such temperature should not be allowed to rise much above 65° C. since at about such a temperature discoloration of the crystal magma takes place.

I have found further that the theoretical critical temperature at which the conversion from sodium citrate penta-hydrate to sodium citrate di-hydrate takes place is 46.0° to 46.5° C. as determined in a dilatometer using carbon tetrachloride. In practice, however, I find that as hereinbefore mentioned the temperature at the graining point should be above 47° C. in order that one may be assured that the di-hydrate will crystallize out free from the penta-hydrate.

A further advantage of the method as herein disclosed rests in the fact that the resulting crystals are very uniform in size and shape and are substantially transparent.

A further advantage rests in that by the hereinabove disclosed method a simpler, quicker, and cheaper method is provided by which substantially pure transparent crystals of sodium citrate di-hydrate may be made.

The resulting crystalline material from the above process comprises individual, stable, non-efflorescing, transparent crystals.

Having thus described my invention in such full, clear, concise, and exact language as to enable others skilled in the art to make and use the same I claim as my invention and desire to secure by Letters Patent the following:

1. A process of obtaining sodium citrate di-hydrate comprising evaporating an aqueous sodium citrate solution under an absolute pressure of not less than 2.6 inches of mercury at a temperature not lower than 47° C.

2. A process of obtaining sodium citrate di-hydrate comprising cooling to not lower than 47° C. an aqueous solution of sodium citrate concentrated under reduced pressure and at a temperature between 47° C. and 65° C.

3. A process of obtaining sodium citrate di-hydrate comprising cooling to above 47° C. an aqueous solution of sodium citrate concentrated under reduced pressure of not less than 2.6 inches of mercury to about 45 degrees Baumé at a temperature not less than 47° C.

4. A process of obtaining sodium citrate di-hydrate comprising cooling to above 47° C. an aqueous solution of sodium citrate concentrated to about 45 degrees Baum° under an absolute pressure of not less than 2.6 inches of mercury.

5. A process of obtaining sodium citrate di-hydrate comprising cooling an aqueous solution of sodium citrate of about 45 degrees Baumé to a temperature not lower than 47° C.

6. A process of obtaining sodium citrate di-hydrate comprising concentrating a solution of sodium citrate under a reduced pressure of 3.4 inches of mercury, at a temperature about 55° C., to a density of 45 degrees Baumé, cooling the liquor to a temperature not lower than 47° C.

7. A process of obtaining sodium citrate di-hydrate which comprises evaporating an aqueous solution of sodium citrate under reduced pressure of not less than 2.6 inches of mercury and at a boiling temperature of from between 47° and 65° C., continuing such evaporation until a satisfactory crop of sodium citrate di-hydrate is obtained, removing the mother liquor by centrifuging to obtain a mass of transparent crystals of sodium citrate di-hydrate.

HOMER H. HOLTON.